(12) United States Patent
Imai et al.

(10) Patent No.: US 8,332,874 B2
(45) Date of Patent: Dec. 11, 2012

(54) APPLICATION EXECUTING TERMINAL

(75) Inventors: Shigeru Imai, Tokyo (JP); Masami Matsubara, Tokyo (JP); Shin Miura, Tokyo (JP); Shinji Akatsu, Tokyo (JP); Takehiko Hanada, Tokyo (JP); Hiroki Sakaguchi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 713 days.

(21) Appl. No.: 12/526,419

(22) PCT Filed: Feb. 9, 2007

(86) PCT No.: PCT/JP2007/052381
§ 371 (c)(1),
(2), (4) Date: Aug. 7, 2009

(87) PCT Pub. No.: WO2008/099456
PCT Pub. Date: Aug. 21, 2008

(65) Prior Publication Data
US 2010/0011377 A1 Jan. 14, 2010

(51) Int. Cl.
*G06F 9/44* (2006.01)
*H04N 5/232* (2006.01)
(52) U.S. Cl. ............... 719/320; 348/14.05; 348/114; 348/211.99; 348/734

(58) Field of Classification Search .................. None
See application file for complete search history.

(56) References Cited

U.S. PATENT DOCUMENTS

| 6,772,394 | B1 | 8/2004 | Kamada |
| 2002/0122076 | A1 | 9/2002 | Nakaki |
| 2003/0051126 | A1* | 3/2003 | Numano et al. .......... 713/1 |

FOREIGN PATENT DOCUMENTS

| JP | 63-228207 A | | 9/1988 |
| JP | 63228207 A | * | 9/1988 |
| JP | 11-143619 A | | 5/1999 |

OTHER PUBLICATIONS

English Translation JP 11-143619.*

* cited by examiner

*Primary Examiner* — Qing Wu
(74) *Attorney, Agent, or Firm* — Birch, Stewart, Kolasch & Birch, LLP

(57) ABSTRACT

An application executing unit 4 makes a request for assignment of a remote control button to an application currently being executed, a button assignment management unit 5 carries out an assignment process of assigning the remote control button to the application, and a user interface unit 2 inquires of the button assignment management unit 5 about an application corresponding to a remote control button indicated by a remote control code received by a remote control code receiving unit 1 shows, and notifies a predetermined event associated with the application to the application executing unit 4.

12 Claims, 11 Drawing Sheets

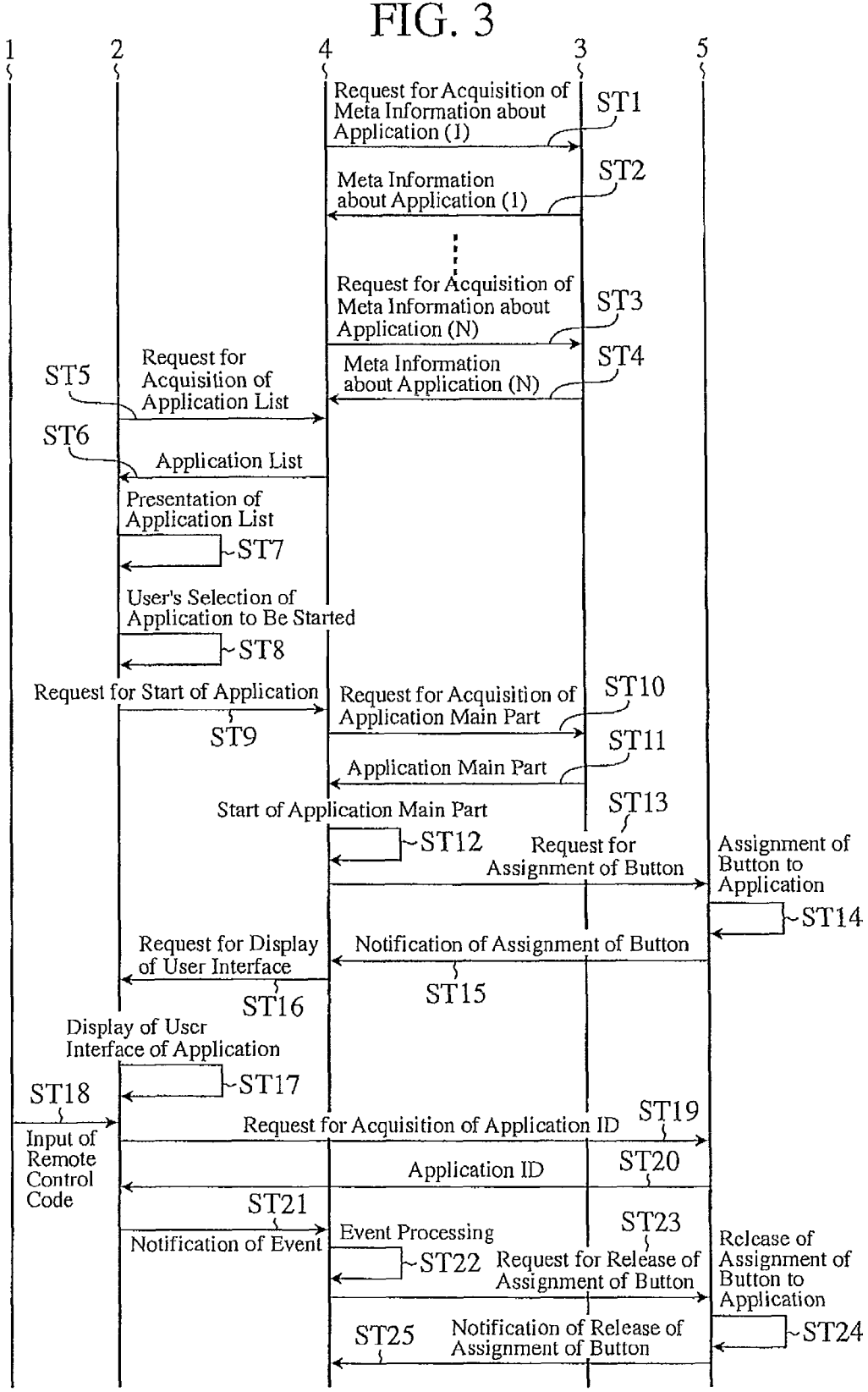

FIG. 4

| Application ID | Main Part File Path | Application Image URL | Description |
|---|---|---|---|
| Weather Forecast | /apps/weather.app | http://www.apps.com/weather.jpg | Display Easily the Weather Forecast of Various Parts of the World |
| Program List | /apps/epg.app | http://www.apps.com/epg.jpg | Newest EPG Information from the Internet |
| Mail Client | /apps/mailer.app | http://www.apps.com/mailer.jpg | Simple Mail Client |
| Photo Album | /apps/photo.app | http://www.apps.com/photo.jpg | Support Slide Show and Sharing of Photos |

41    42    43    44

| Button | Application ID |
|---|---|
| 1 | Yet-to-Be Assigned |
| 2 | Program List |
| 3 | Mail Client |
| 4 | Photo Album |
| . . . | . . . |

FIG. 9

| Application ID | Desired Button for Start | Category | Main Part File Path | Application Image URL | Description |
|---|---|---|---|---|---|
| Weather Forecast | Blue Button | Information | /apps/weather.app | http://www.apps.com/weather.jpg | Display Easily the Weather Forecast of Various Parts of the World |
| Program List | Red Button | EPG | /apps/epg.app | http://www.apps.com/epg.jpg | Newest EPG Information from the Internet |
| Mail Client | Yellow Button | Other | /apps/mailer.app | http://www.apps.com/mailer.jpg | Simple Mail Client |
| Photo Album | Green Button | Other | /apps/photo.app | http://www.apps.com/photo.jpg | Support Slide Show and Sharing of Photos |

| Application ID | Registered Event |
|---|---|
| Mail Client | Reception of Newly-Arrived Mail Completion of Transmission |

| Button | Application ID | User Interface State |
|---|---|---|
| 1 | Mail Client | Not Displayed |
| 2 | Weather Forecast Program List | Not Displayed Currently Displayed |
| ... | ... | ... |

162
161
Newly-Arrived Mail Received

APPLICATION EXECUTING TERMINAL

FIELD OF THE INVENTION

The present invention relates to an application executing terminal that carries out a process of starting an application, a process of handling an event, or the like according to a user's operation on a remote control button.

BACKGROUND OF THE INVENTION

In a conventional application executing terminal, when starting an application according to a user's operation on a remote control button, the user needs to make settings on predetermined items of the application in advance.

Concretely, the user needs to set up, in advance, the following items: a title, a file name, arguments, a current working directory, and so on of the application which are to be assigned to the remote control button.

By setting up the above-mentioned items in advance, the user can start the application by simply pushing down the remote control button once (refer to patent reference 1).

[Patent reference 1] JP, 11-143619, A (see paragraph number and FIG. 1)

A problem with the conventional application executing terminal which is constructed as mentioned above is that in order to enable the user to cause the conventional application executing terminal to start an application by simply pushing down a remote control button once, the user needs to, for example, set up, in advance, the following items: a title, a file name, arguments, a current working directory, and so on of the application which are to be assigned to the remote control button.

The present invention is made in order to solve the above-mentioned problem, and it is therefore an object of the present invention to provide an application executing terminal that can allow a user to cause the application executing terminal to carry out a process of starting an application, a process of handling an event, or the like by simply pushing down a remote control button once without making any troublesome settings in advance.

DISCLOSURE OF THE INVENTION

An application executing terminal in accordance with the present invention includes: a button assignment request means for making a request for assignment of an operation button to an application currently being executed by an application executing means; a button assignment control means for carrying out a process of assigning an operation button to an application for which a request for assignment of the operation button has been made by the button assignment request means, and for managing an assignment relation between the operation button and the application; and an operation information receiving means for receiving operation information indicating an operation button operated by a user, and an event notification means inquires of the button assignment control means about an application corresponding to the operation button indicated by the operation information received by the operation information receiving means to notify a predetermined event associated with the application to the application executing means.

Therefore, the present invention provides an advantage of being able to enable the user to push down a remote control button only once so as to make the application executing terminal perform a process of handling an event without making any troublesome settings in advance.

BRIEF DESCRIPTION OF THE FIGURES

FIG. 3 is a sequence diagram showing processing which is carried out by the application executing terminal in accordance with Embodiment 1 of the present invention;

FIG. 4 is an explanatory drawing showing an application list;

FIG. 9 is an explanatory drawing showing an application list;

PREFERRED EMBODIMENTS OF THE INVENTION

Hereafter, in order to explain this invention in greater detail, the preferred embodiments of the present invention will be described with reference to the accompanying drawings.

Embodiment 1.

Figure 1:
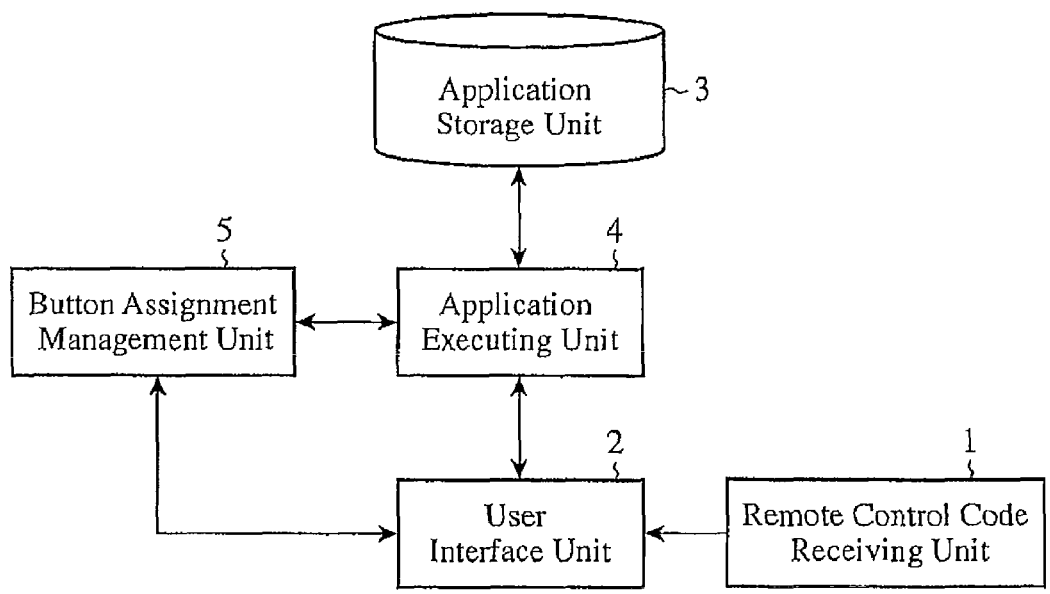
FIG. 1 is a block diagram showing an application executing terminal in accordance with Embodiment 1 of the present invention.

FIG. 1 is a block diagram showing an application executing terminal in accordance with Embodiment 1 of the present invention. In the figure, a remote control code receiving unit 1 is a communication interface for receiving a remote control code (operation information showing a remote control button (an operation button) operated by a user), such as an infrared signal, which is transmitted from a remote control. The remote control code receiving unit converts the remote control code into a code in a form which the user interface unit 2 can interpret, and sends the code to a user interface unit 2. The remote control code receiving unit 1 constructs an operation information receiving means.

The user interface unit 2 is a man machine interface which is comprised of an input unit, such as a mouse or a keyboard, and a display unit, such as a display. The user interface unit 2 has a start request function of accepting a selection of an application to be started to make a request of an application executing unit 4 for start of the application, an event notification function of inquiring of a button assignment management unit 5 about an application ID corresponding to the remote control button shown by the remote control code received by the remote control code receiving unit 1 to notify a predetermined event associated with the application ID to the application executing unit 4, a display function of displaying a user interface screen showing an application currently being executed by the application executing unit 4, and displaying an assignment relation between remote control buttons and applications which is managed by the button assignment management unit 5, and so on.

The user interface unit 2 constructs a start request means, an event notification means, and an assignment relation display means.

An application storage unit 3 is a memory for storing the main parts of applications (e.g. application programs), and pieces of meta information about the applications (for example, meta information includes an application ID for identifying an application, a main part file path indicating a location where a file which is the main part of the application exists, a URL (Uniform Resource Locator) indicating a location where a picture image of the application is stored, and a description about the application).

The application executing unit 4 is comprised of a semiconductor integrated circuit substrate, such as a CPU, and has an application execution function of acquiring the main part of an application for which a start request has been made by the user interface unit 2 from the application storage unit 3, and then executing the application, a button assignment request function for making a request of the button assignment management unit 5 for assignment of a remote control button to the application currently being executed, an assigned button notifying function of, when there exists a remote control button to which a predetermined function has been assigned, notifying the button assignment management unit 5 that a predetermined function has been assigned to the remote control button, and so on.

The application executing unit 4 constructs an application executing means for executing an application, a button assignment request means, and an assigned button notifying means.

The button assignment management unit 5 is comprised of a semiconductor integrated circuit substrate, such as a CPU, and carries out an assignment process of assigning a remote control button to an application for which a request for assignment of a remote control button has been made by the application executing unit 4, and a process of managing the assignment relation between remote control buttons and applications. The button assignment management unit 5 constructs a button assignment control means.

Figure 2:
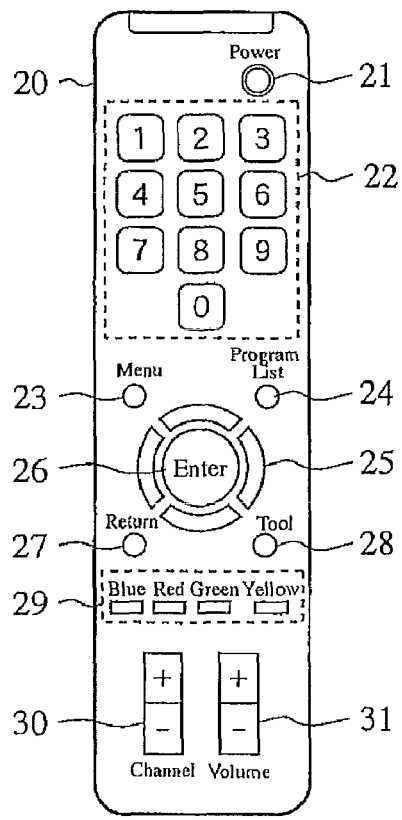
FIG. 2 is a structural diagram showing a remote control. for operating the application executing terminal in accordance with Embodiment 1 of the present invention.

FIG. 2 is a structural diagram showing the remote control used for operating the application executing terminal in accordance with Embodiment 1 of the present invention.

As shown in the figure, a power button 21, number buttons 22, a menu button 23, a program list button 24, direction buttons 25, an enter button 26, a return button 27, a tool button 28, four colored buttons 29 (blue, red, green, and yellow buttons), a channel up/down button 30, and a volume control button 31 are mounted in a main body 20 of the remote control.

Although an example in which a user operates the user interface unit 2 of the application executing terminal by using the remote control will be explained in this Embodiment 1, the equipment used for operating the user interface unit 2 of the application executing terminal is not limited to the remote control, and, for example, buttons mounted in the application executing terminal, a touch panel which enables a button input or the like can be alternatively used.

FIG. 3 is a sequence diagram showing processing which is carried out by the application executing terminal in accordance with Embodiment 1 of the present invention.

Next, the operation of the application executing terminal will be explained.

First, the application executing unit 4 issues a request for acquisition of the meta information about an application to the application storage unit 3 (step ST1), and acquires the meta information about the application stored in the application storage unit 3 (step ST2).

In a case in which the application storage unit 3 stores the plural pieces of meta information about N applications, the application executing unit 4 repeats the above-mentioned processes N times so as to acquire the plural pieces of meta information about the N applications (steps ST3 and ST4).

After acquiring the pieces of meta information about the N applications, the application executing unit 4 generates an application list showing executable applications from the pieces of meta information.

FIG. 4 is an explanatory drawing showing the application list. In the figure, reference numeral 41 denotes an application ID for identifying each application, reference numeral 42 denotes a main part file path indicating a location where a file which is the main part of each application exists, reference numeral 43 denotes a URL indicating a location where a picture image of each application is stored, and reference numeral 44 denotes a description about each application.

The user interface unit 2 then issues a request for acquisition of the application list to the application executing unit 4 (step ST5), and acquires the application list from the application executing unit 4 (step ST6).

When acquiring the application list from the application executing unit 4, the user interface unit 2 displays the application list on the display or the like (step ST7), and urges the user to select an application to be started.

When the user operates the user interface unit 2 to select an application to be started from the application list (step ST8), the user interface unit 2 issues a request for start of the application to the application executing unit 4 (step ST9).

When receiving the request for start of the application from the user interface unit 2, the application executing unit 4 acquires the main part file path 42 of the application from the application list of FIG. 4.

The application executing unit 4 then outputs a request for acquisition of the application main part, as well as the main part file path 42, to the application storage unit 3 (step ST10), and acquires the application main part from the application storage unit 3 (step ST11).

When acquiring the application main part from the application storage unit 3, the application executing unit 4 starts the application main part (step ST12) so as to start executing the application.

The application which has been started to be executed by the application executing unit 4 specifies the application ID thereof and a remote control button of which the application makes a request for assignment.

The application executing unit 4 outputs the application ID and the remote control button of which the application makes a request for assignment, the application ID and the remote control button being specified by the application currently being executed, to the button assignment management unit 5, and issues a request for assignment of the remote control button to the application currently being executed to the button assignment management unit 5 (step ST13).

The button assignment management unit 5 manages a button assignment management table showing the assignment relation between remote control buttons and applications.

Figures 5, 6:
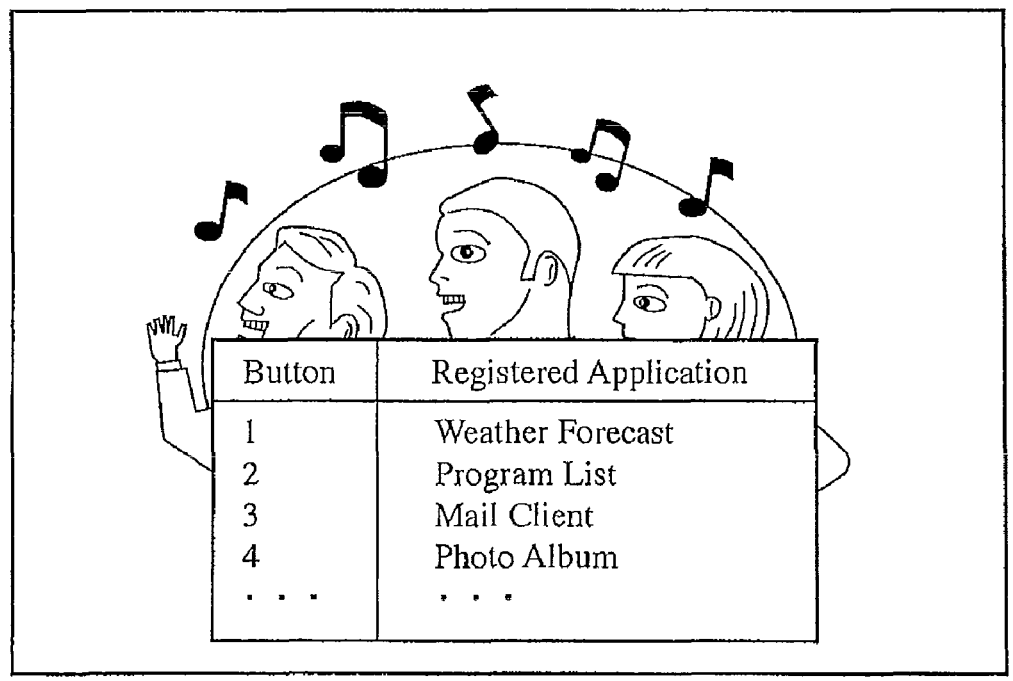
FIG. 5 is an explanatory drawing showing a button assignment management table.
FIG. 6 is an explanatory drawing showing a list of registered applications displayed on a user interface screen.

FIG. 5 is an explanatory drawing showing the button assignment management table.

In FIG. 5, an example in which a "program list" application is assigned to a remote control button "2", a "mail client" application is assigned to a remote control button "3", and a "photo album" application is assigned to a remote control button "4" is shown.

Because no application has been assigned to a remote control button "1" yet, "yet-to-be assigned" is described in the corresponding application ID.

The user can refer to the button assignment management table as shown in FIG. 5 managed by the button assignment management unit 5 at any time by operating the user interface unit 2.

More specifically, when receiving a request for presentation of the button assignment management table from the user, the user interface unit 2 acquires the button assignment management table from the button assignment management unit 5 so as to generate a list of registered applications currently assigned to remote control buttons, and displays the list of the registered applications on a user interface screen on which an image is currently being played back, as shown in FIG. 6.

When receiving the request for assignment of the remote control button from the application executing unit 4, the button assignment management unit 5 refers to the button assignment management table as shown in FIG. 5 so as to determine whether or not the remote control button assignment of which has been requested by the application executing unit 4 is a "yet-to-be assigned" remote control button.

For example, in a case in which the remote control button assignment of which has been requested, which is outputted from the application executing unit 4, is "1", the button assignment management unit 5 assigns the application ID (e.g. weather forecast) outputted from the application executing unit 4 to the remote control button "1" because this remote control button is "yet-to-be assigned" (step ST14).

In contrast, in a case in which the remote control button assignment of which has been requested, which is outputted from the application executing unit 4, is "2" or "3", the button assignment management unit cancels the assignment of the remote control button to the "weather forecast" application because an application has been assigned to the remote control button and hence this remote control button is not "yet-to-be assigned".

The "weather forecast" application acquires weather forecast information from an external information source, such as a data broadcast or a weather information providing site on the Internet, and then displays the weather forecast information. In FIG. 1, any interface for acquiring the weather forecast information from outside the application executing terminal is not illustrated.

After performing the assignment process of assigning the remote control button to the application, the button assignment management unit 5 notifies the result of the assignment of the remote control button to the application executing unit 4 (step ST15).

More specifically, when succeeding in the assignment of the remote control button to the application, the button assignment management unit 5 informs the remote control button which the button assignment management unit has succeeded in assigning to the application to the application executing unit. In contrast, when failing in the assignment of the remote control button to the application, the button assignment management unit notifies that the button assignment management unit cannot assign the remote control button to the application to the application executing unit.

When receiving the result of the assignment of the remote control button from the button assignment management unit 5 and judging that the assignment result shows "the remote control button assignment of which has ended in success", the application executing unit 4 outputs button information showing the remote control button to the user interface unit 2, and then issues a request for display of a user interface to the user interface unit 2 (step ST16).

Figure 7:
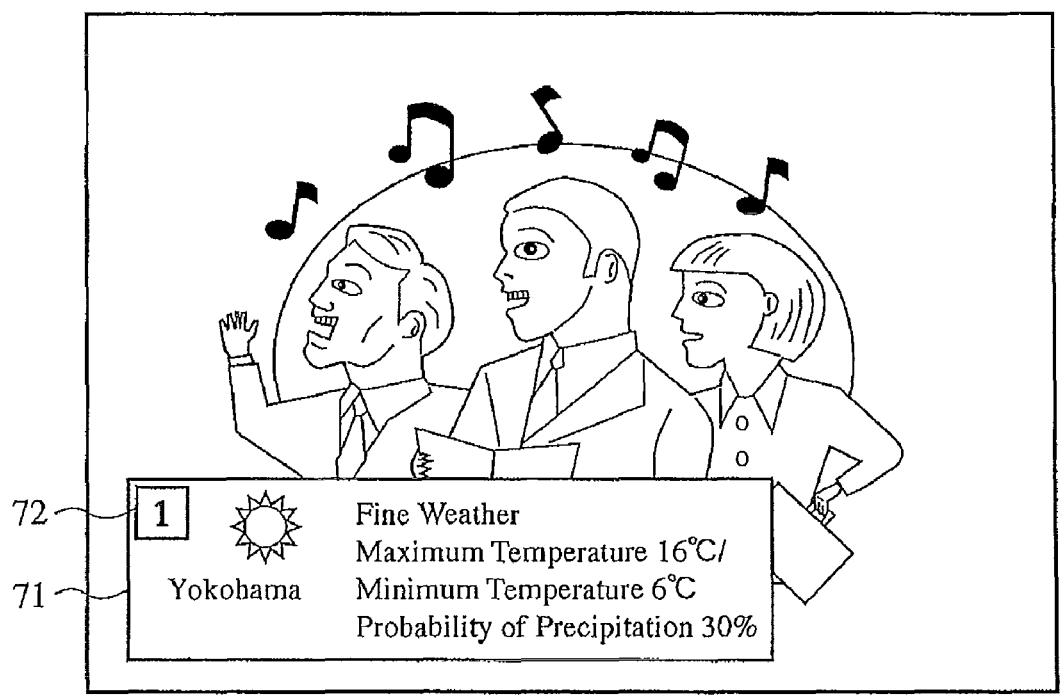
FIG. 7 is an explanatory drawing showing an example of display of a "weather forecast" application 71 and button display characters 72 on the user interface screen.

When receiving the button information and the request for display of a user interface from the application executing unit 4, the user interface unit 2 displays the "weather forecast" application 71 on the user interface screen, as shown in FIG. 7, in which an image is currently being played back, and also displays button display characters 72 which are generated from the button information by the "weather forecast" application 71 on the user interface screen (step ST17).

The example in which the "weather forecast" application 71 generates the button display characters 72 from the button information and then displays the button display characters 72 is shown above, though the user interface unit 2 can generate the button display characters 72 from the button information, and display the button display characters 72 on behalf of the application.

Next, when the user pushes down a button of the remote control, the remote control transmits a remote control code corresponding to the remote control button pushed down by the user (i.e. operation information showing the remote control button operated by the user).

When receiving the remote control code transmitted from the remote control, the remote control code receiving unit 1 converts the remote control code into a remote control code in a form which can be interpreted by the user interface unit 2, and then delivers the remote control code to the user interface unit 2 (step ST18).

When receiving the remote control code from the remote control code receiving unit 1, the user interface unit 2 issues a request for acquisition of an application ID corresponding to the remote control button shown by the remote control code to the button assignment management unit 5 in order to verify the application currently assigned to the remote control button shown by the remote control code (step ST19).

When receiving the request of acquisition of the application ID corresponding to the remote control button from the user interface unit 2, the button assignment management unit 5 verifies the application ID corresponding to the remote control button with reference to the button assignment management table as shown in FIG. 5, and notifies the application ID to the user interface unit 2 (step ST20).

However, when the application ID corresponding to the remote control button shows "yet-to-be assigned", the button assignment management unit notifies the user interface unit 2 that no application ID has been assigned to the remote control button.

When receiving the notification of the application ID corresponding to the remote control button from the button assignment management unit 5, the user interface unit 2 notifies a predetermined event associated with the application ID to the application executing unit 4 (step ST21).

In this case, a "predetermined event" is registered in advance as an event to be notified to an application specified by an application ID when a corresponding remote control button which is registered in the button assignment management table as shown in FIG. 5 is pushed down.

An application developer can develop a user-friendly application by describing the operation of the application associated with such a predetermined event assuming the use of this event.

When receiving the notification of the predetermined event from the user interface unit 2, the application currently being executed by the application executing unit 4 performs a process corresponding to the event (step ST22).

After the application currently being executed by the application executing unit 4 performs the process corresponding to the event, the application judges whether or not there is a necessity to keep the assignment of the remote control button to the event, and, when judging that there is no necessity to keep the assignment of the remote control button to the event, make a request for deassignment of the remote control button.

When the application makes a request for deassignment of the remote control button, the application executing unit 4 outputs the application ID of the application to the button assignment management unit 5, and further issues a request for deassignment of the remote control button to the button assignment management unit 5 (step ST23).

In this embodiment, the application currently being executed judges whether or not there is a necessity to keep the assignment of the remote control button thereto, and makes a request for deassignment of the remote control button, as shown above. This embodiment is not limited to this example. For example, there can be provided a variant in which when the user pushes down the remote control button which has been assigned to the application once and a predetermined event is notified to the application, the assignment of the remote control button to the application is forcedly released.

When receiving the application ID and the request for deassignment of the remote control button from the application executing unit 4, the button assignment management unit 5 sets the application ID in the button assignment management table as shown in FIG. 5 to "yet-to-be assigned" to release the assignment of the remote control button to the application ID (step ST24), and then notifies the application executing unit 4 that the button assignment management unit has released the assignment of the remote control button to the application ID (step ST25).

As can be seen from the above description, the application executing terminal in accordance with this Embodiment 1 is constructed in such a way that the application executing unit 4 makes a request for assignment of a remote control button to an application currently being executed, the button assignment management unit 5 carries out the assignment process of assigning the remote control button to the application, and the user interface unit 2 inquires of the button assignment management unit 5 about an application corresponding to a remote control button indicated by a remote control code received by the remote control code receiving unit 1, and then notifies a predetermined event associated with the application to the application executing unit 4. Therefore, this embodiment offers an advantage of being able to enable the user to push down a remote control button only once so as to cause the application executing terminal to perform a process of handling an event without making any troublesome settings in advance.

Particularly, even in an environment in where the type of an application being executed varies dynamically, the application executing terminal automatically performs the assignment process of assigning a remote control button to each application when starting each application. Therefore, the application executing terminal enables the user to operate an application only by performing a simple operation of manipulating a remote control button.

Embodiment 2.

In above-mentioned Embodiment 1, the application executing terminal that informs an application ID specified by an application currently being executed and a remote control button assignment of which the application executing terminal will make a request to the button assignment management unit 5 so as to make a request of the button assignment management unit 5 for assignment of the remote control button to the application currently being executed is shown. In a case in which the button assignment management unit 5 manages a predetermined event associated with an application in addition to the assignment relation between remote control buttons and applications, the application executing unit 4 can inquire of the button assignment management unit 5 about an event associated with an application to which the application executing unit 4 will make a request for assignment of a remote control button.

In this case, the button assignment management unit 5 carries out the assignment process of assigning the remote control button to the application, as in the case of above-mentioned Embodiment 1, and notifies, as well as the result of the assignment of the remote control button, the event associated with the application to the application executing unit 4.

When the remote control button is pushed down by a user and the application executing unit 4 carries out predetermined event processing (step ST22), the application executing unit 4 executes, instead of a predetermined event, the event associated with the application which is notified thereto from the button assignment management unit 5.

As can be seen from the above description, the application executing terminal in accordance with this Embodiment 2 is constructed in such a way that in the case in which the button assignment management unit 5 manages a predetermined event associated with an application in addition to the assignment relation between remote control buttons and applications, the application executing unit inquires of the button assignment management unit 5 about an application corresponding to a remote control button indicated by a remote control code received by the remote control code receiving unit 1 and also inquires of the button assignment management unit 5 about an event associated with the application, and the button assignment management unit notifies the event associated with the application to the application executing unit 4. Therefore, the present embodiment provides an advantage of being able to enable the user to push down a remote control button only once so as to make the application executing terminal perform a process of handling an event without making any troublesome settings in advance, like above-mentioned Embodiment 1.

Embodiment 3.

In above-mentioned Embodiment 1, the application executing terminal that, when the application executing unit 4 makes a request for assignment of a remote control button to an application currently being executed thereby, allows the application to specify the remote control button assignment of which the application executing unit will make a request is shown. As an alternative, the application currently being executed can specify a rule for assignment of a remote control button.

More specifically, when the application executing unit 4 makes a request for assignment of a remote control button to an application, the application currently being executed specifies, as the rule for assignment of a remote control button, a button assignment policy as shown below as an example.

(1) Specify priorities of button assignment (for example, a first priority level: a program list button, and a second priority level: a blue button).

(2) Specify a region of button assignment (for example, any of four colored buttons can be specified, or any of number buttons can be specified).

(3) Any button can be specified.

When receiving the button assignment policy which is specified by the application currently being executed from the application executing unit 4, the button assignment management unit 5 carries out the assignment process of assigning a remote control button to the application according to the button assignment policy.

For example, in a case in which priorities of button assignment are specified, if the button assignment management unit can assign any of the program list button having the first priority level and the blue button having the second priority level to the application, the button assignment management unit assigns, as the remote control button associated with the application, the program list button having the first priority level.

As can be seen from the above description, the application executing terminal in accordance with this Embodiment 3 is constructed in such a way that when the application executing unit 4 makes a request for assignment of a remote control button to an application, the application currently being executed specifies a rule for assignment of a remote control button, and the button assignment management unit 5 carries out the assignment process of assigning the remote control button to the application according to the rule for assignment of a remote control button. Therefore, the present embodiment offers an advantage of being able to assign the most appropriate one of remote control buttons which can be assigned to the application.

Embodiment 4.

Although no mention has been made particularly in above-mentioned Embodiment 1, there is a case in which depending on the state of the user interface, a predetermined function has been assigned to each remote control button (e.g. each of number buttons for channel specification which are used at the time when a user watches TV).

In such a case, the user interface unit 2 transmits information about remote control buttons to each of which a predetermined function has been assigned to the button assignment management unit 5.

When receiving the information about remote control buttons to each of which a predetermined function has been assigned from the user interface unit 2, the button assignment management unit 5 registers information indicating "already assigned" or the like into the application ID of each of the remote control buttons in the button management table as shown in FIG. 5 so as to prevent any of the remote control buttons from being assigned to any new application.

As can be seen from the above description, the application executing terminal in accordance with this Embodiment 4 is constructed in such a way that when there exists a remote control button to which a predetermined function has been assigned, the user interface unit notifies the button assignment management unit 5 that an assignment has been made for the remote control button. Therefore, the present embodiment offers an advantage of being able to flexibly make an assignment of a remote control button according to which one of a plurality of user interface states in which different button assignments have been made is the current one of the user interface.

Embodiment 5.

In above-mentioned Embodiment 1, when the user operates the user interface unit 2 to select an application to be started from the application list, the user interface unit 2 issues a request for start of the application to the application executing unit 4, as shown above. As an alternative, the user interface unit 2 can inquire of the button assignment management unit 5 about an application corresponding to a remote control button indicated by a remote control code received by the remote control code receiving unit 1, and issue a request for start of the application to the application executing unit 4.

Concretely, this processing is carried out as follows.

Figure 8:
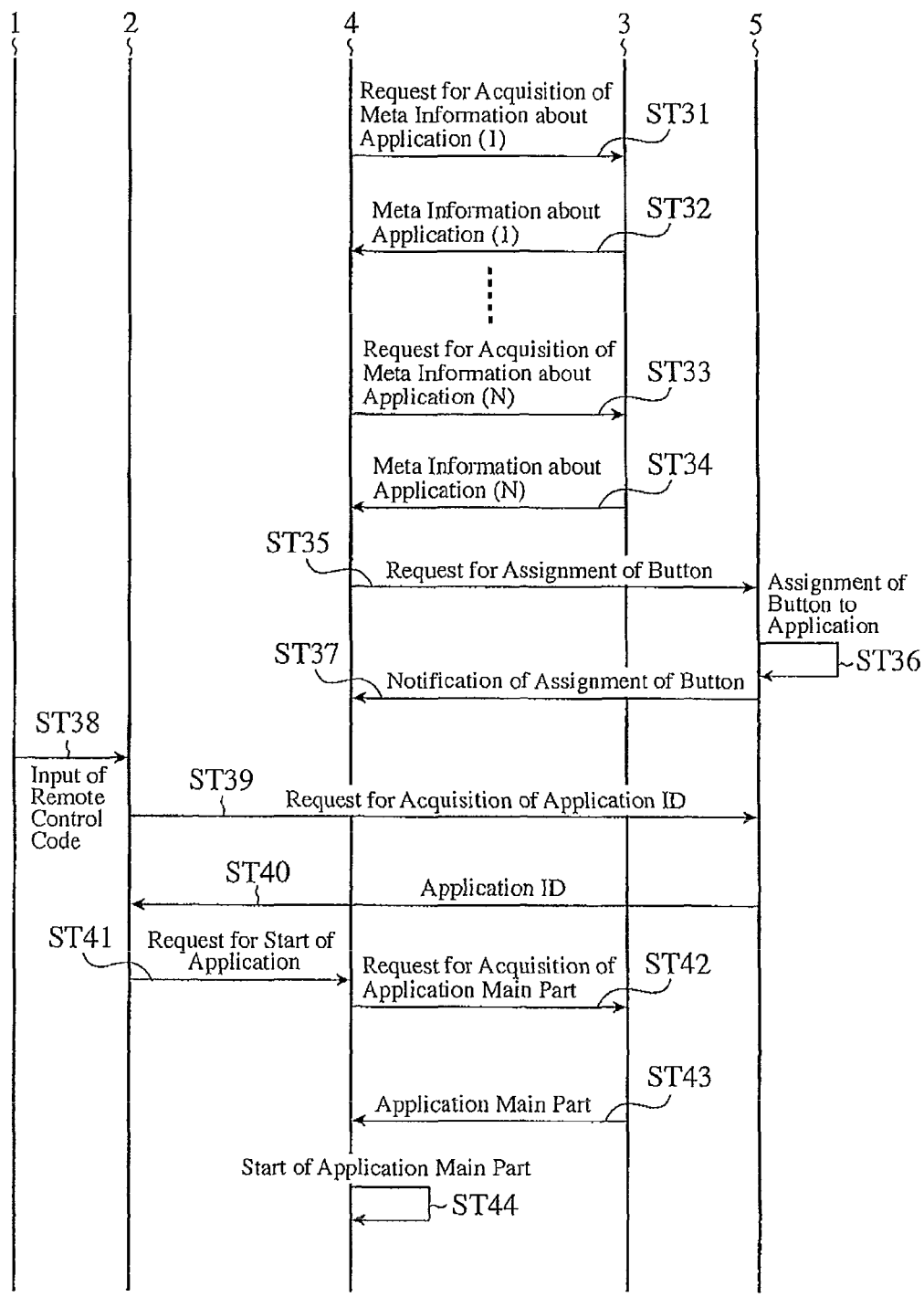
FIG. 8 is a sequence diagram showing processing which is carried out by an application executing terminal in accordance with Embodiment 5 of the present invention.

FIG. 8 is a sequence diagram showing processing which is carried out by the application executing terminal in accordance with Embodiment 5 of the present invention.

First, the application executing unit 4 issues a request for acquisition of meta information about an application to the application storage unit 3 (step ST31), and then acquires the meta information about the application which is stored in the application storage unit 3 (step ST32).

When the application storage unit 3 stores pieces of meta information about N applications, the application executing unit 4 repeats the above-mentioned processes N times so as to acquire the pieces of meta information about the N applications (steps ST33 and ST34).

After acquiring the pieces of meta information about the N applications, the application executing unit 4 generates an application list indicating executable applications from the pieces of meta information.

FIG. 9 is an explanatory drawing showing the application list. In the figure, reference numeral 91 denotes an application ID for identifying each application, reference numeral 92 denotes a remote control button for startup which each application desires, reference numeral 93 denotes a category to which each application belongs, reference numeral 94 denotes a main part file path indicating a location where a file which is a main part of each application exists, reference numeral 95 denotes a URL indicating a location where a picture image of each application is stored, and reference numeral 96 denotes a description about each application.

After generating the application list, the application executing unit 4 outputs information about the correspondence between the application ID 91 and the remote control button 92 for startup of each application which are described in the application list to the button assignment management unit 5, and issues a request for assignment of a remote control button to the button assignment management unit 5 (step ST35).

When receiving a request for assignment of a remote control button from the application executing unit 4, the button assignment management unit 5 refers to the information about the correspondence between the application ID 91 and the remote control button 92 for startup of each application, the correspondence information being outputted from the application executing unit 4, so as to check whether the assignment of a remote control button to each application can be performed (i.e. check whether the assignment of a remote control button to each application can be performed with reference to the button assignment management table as shown in FIG. 5), and, when the assignment of a remote control button to each application can be performed, carries out the assignment process of assigning a remote control button to each application (step ST36).

When performing the assignment process of assigning a remote control button to each application, the button assignment management unit 5 notifies the results of the assignment of a remote control button to each application to the application executing unit 4 (step ST37).

More specifically, when having succeeded in the assignment of a remote control button to an application, the button assignment management unit 5 informs the remote control button which the button assignment management unit has succeeded in assigning to the application to the application executing unit. In contrast, when having failed in assigning a remote control button to an application, the button assignment management unit notifies the application executing unit that the button assignment management unit cannot assign any remote control button to the application.

In this embodiment, the application executing unit 4 outputs the information about the correspondence between the application ID 91 and the remote control button 92 for startup of each application which are described in the application list to the button assignment management unit 5, and makes a request for assignment of a remote control button to each application, as shown above. As an alternative, the application executing unit 4 can output a rule for determination of a remote control button to the button assignment management unit 5, and make a request for assignment of a remote control button. The user interface unit 2 can accept settings for the rule for determination of a remote control button which are made by the user.

In this case, the button assignment management unit 5 carries out the assignment process of assigning a remote control button to each application according to the rule for determination of a remote control button.

Concretely, the application executing unit 4 outputs information about the correspondence between the application ID 91 and the category 93 of each application which are described in the application list to the button assignment management unit 5, and makes a request for assignment of a remote control button to each application.

In this case, the button assignment management unit 5 carries out the assignment process of assigning a remote control button corresponding to the category 93 to each application.

For example, when the category of an application is "EPG (Electronic Programming Guide)", the button assignment management unit assigns a program list button 24 of the remote control to the application.

When the user then pushes down a button of the remote control, the remote control transmits a remote control code corresponding to the remote control button pushed down by the user.

When receiving the remote control code transmitted from the remote control, the remote control code receiving unit 1 converts the remote control code into a code in a form which the user interface unit 2 can interpret, and notifies the code to the user interface unit 2 (step ST38).

When receiving the remote control code from the remote control code receiving unit 1, in order to verify an application currently being assigned to the remote control button indicated by the remote control code, the user interface unit 2 issues a request for acquisition of an application ID corresponding to the remote control button indicated by the remote control code to the button assignment management unit 5 (step ST39).

When receiving the request for acquisition of the application ID corresponding to the remote control button from the user interface unit 2, the button assignment management unit 5 verifies the application ID corresponding to the remote control button with reference to the button assignment management table as shown in FIG. 5, and notifies the application ID to the user interface unit 2 (step ST40).

However, when the application ID corresponding to the remote control button is "yet-to-be assigned", the button assignment management unit notifies the user interface unit 2 that no application ID has not been assigned to the remote control button.

When receiving the notification of the application ID corresponding to the remote control button from the button assignment management unit 5, the user interface unit 2 issues a request for start of the application having the application ID to the application executing unit 4 (step ST41).

When receiving the request for start of the application from the user interface unit 2, the application executing unit 4 acquires the main part file path 42 of the application from the application list shown in FIG. 4.

The application executing unit 4 then outputs a request for acquisition of the application main part, as well as the main part file path 42, to the application storage unit 3 (step ST42), and acquires the application main part from the application storage unit 3 (step ST43).

When acquiring the application main part from the application storage unit 3, the application executing unit 4 starts the application main part (step ST44) to start executing the application.

As can be seen from the above description, the application executing terminal in accordance with this Embodiment 5 is constructed in such a way that the user interface unit 2 inquires of the button assignment management unit 5 about an application corresponding to a remote control button indicated by a remote control code received by the remote control code receiving unit 1, and issues a request for start of the application to the application executing unit 4. Therefore, the present embodiment provides an advantage of being able to enable the user to push down a remote control button only once so as to make the application executing terminal perform event processing without making any troublesome settings in advance.

Furthermore, the application executing terminal in accordance with this Embodiment 5 is constructed in such a way that the application executing unit 4 manages pieces of meta information about applications, and, when making a request for assignment of a remote control button to an application, refers to the meta information about the application and notifies the remote control button which the application executing unit desires to assign to the button assignment management unit 5. Therefore, the present embodiment offers an advantage of being able to automatically assign the remote control button to the application without causing the user to make troublesome settings in advance.

Furthermore, in a case in which the application executing unit 4 outputs a rule for determination of a remote control button to the button assignment management unit 5 and makes a request for assignment of a remote control button to an application, the application executing terminal can carry out an automatical assignment of one of various remote control buttons to an application.

Embodiment 6.

Although no mention has been made particularly in above-mentioned Embodiment 1, the user interface unit 2 can construct an arrangement accepting means for accepting arrangement of applications on a user interface screen, and the application executing unit 4 can notify the arrangement of applications accepted by the user interface unit 2 to the button assignment management unit 5 when making a request for assignment of a remote control button to an application.

Concretely, this processing is carried out as follows.

Figure 10:
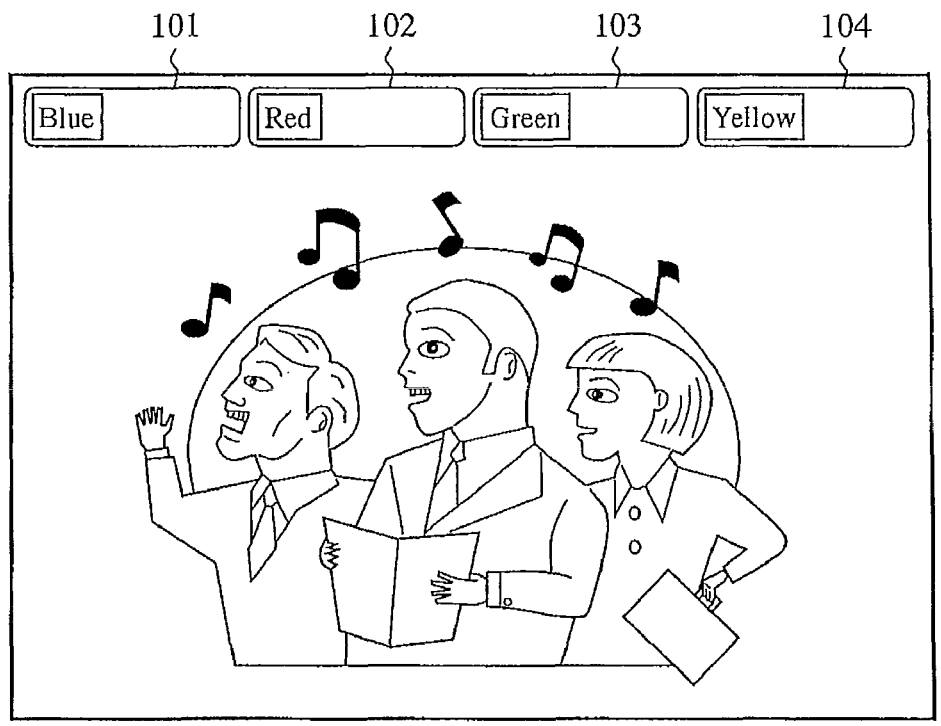
FIG. 10 is an explanatory drawing showing a user interface screen generated by a user interface unit 2 of an application executing terminal in accordance with Embodiment 6 of the present invention.

FIG. 10 is an explanatory drawing showing the user interface screen generated by the user interface unit 2 of the application executing terminal in accordance with Embodiment 6 of the present invention.

In the figure, reference numeral 101 denotes the position in the user interface screen of an application to which a blue-colored button is to be assigned, reference numeral 102 denotes the position in the user interface screen of an application to which a red-colored button is to be assigned, reference numeral 103 denotes the position in the user interface screen of an application to which a green-colored button is to be assigned, and reference numeral 104 denotes the position in the user interface screen of an application to which a yellow-colored button is to be assigned.

The application positions 101 to 104 respectively correspond to the positions of the four colored buttons 29 in the remote control shown in FIG. 2.

The user interface unit 2 acquires an application list as shown in FIG. 4 or FIG. 9 from the application executing unit 4, and displays the application list on the display or the like to urge the user to select applications to be respectively placed at the application positions 101 to 104.

When the user operates the user interface unit 2 to select applications to be respectively placed at the application positions 101 to 104, the user interface unit 2 notifies the applications to be respectively placed at the application positions 101 to 104 to the application executing unit 4.

Upon receipt of the notification of the applications to be respectively placed at the application positions 101 to 104 from the user interface unit 2, the application executing unit 4 notifies the applications to be respectively placed at the application positions 101 to 104 to the button assignment management unit 5 when issuing a request for assignment of a remote control button to each of the applications to the button assignment management unit 5.

When receiving a request for assignment of a remote control button to each of the applications, the button assignment management unit 5 specifies the colored buttons whose positions respectively correspond to the application positions 101 to 104 from the four colored buttons 29 of the remote control shown in FIG. 2, and then assigns the colored buttons to the applications to be placed at the application positions 101 to 104 respectively.

Because the subsequent processes are the same as those of above-mentioned Embodiment 1, the description about the subsequent processes will be omitted.

As can be seen from the above description, the application executing terminal in accordance with this Embodiment 6 is constructed in such a way that the user interface unit 2 carries out the process of accepting the arrangement of applications on the user interface screen, and the application executing unit 4 notifies the arrangement of applications accepted by the user interface unit 2 to the button assignment management unit 5 when making a request for assignment of a remote control button to each of the applications. Therefore, the present embodiment provides an advantage of being able to carry out the assignment process of assigning a remote control button to each application to enable the user to intuitively grasp applications corresponding to the four colored buttons 29 as long as the application positions 101 to 104 on the user interface screen respectively correspond to the positions of the four colored buttons 29 in the remote control.

Figure 11:
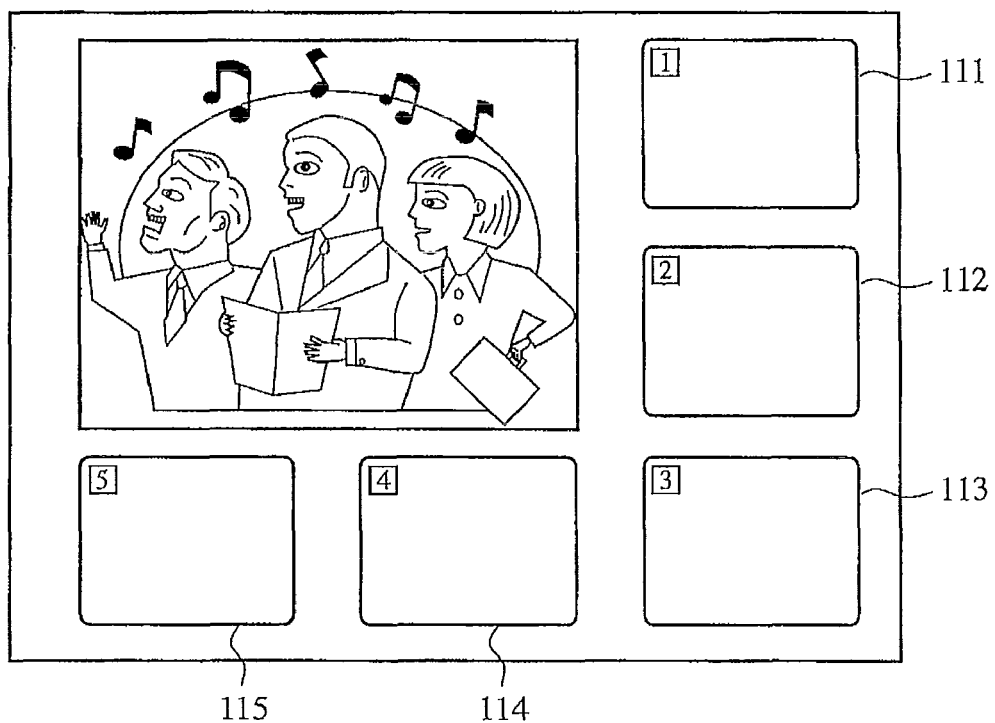
FIG. 11 is an explanatory drawing showing a user interface screen generated by the user interface unit 2 of the application executing terminal in accordance with Embodiment 6 of the present invention.

In this Embodiment 6, the application positions 101 to 104 on the user interface screen respectively correspond to the application positions for assignment of colored buttons, as shown above. However, this Embodiment 6 is not limited to this example, and, for example, application positions 111 to 115 on the user interface screen can respectively correspond to application positions for assignment of number buttons, as shown in FIG. 11.

Embodiment 7.

Figure 12:
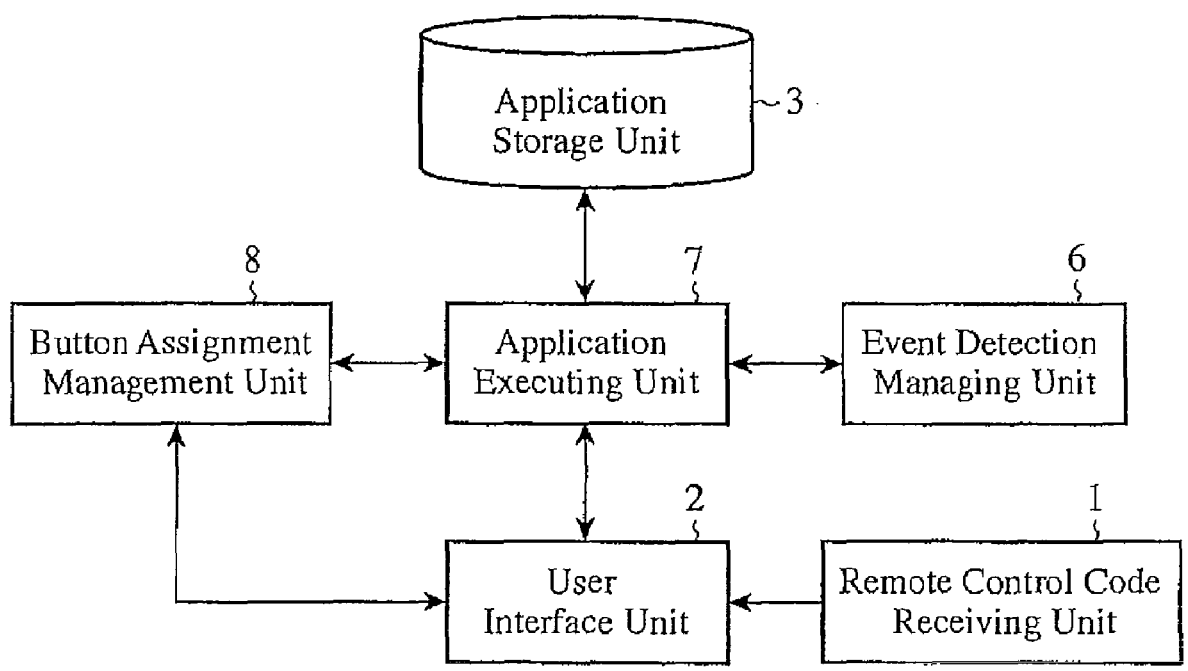
FIG. 12 is a block diagram showing an application executing terminal in accordance with Embodiment 7 of the present invention.

FIG. 12 is a block diagram showing an application executing terminal in accordance with Embodiment 7 of the present invention. In the figure, because the same reference numerals as those shown in FIG. 1 denote the same components or like components, the description of the components will be omitted hereafter.

An event detection managing unit 6 accepts registration of an event associated with an application currently being executed by an application executing unit 7, and carries out a detecting process of detecting occurrence of the event. The event detection managing unit 6 constructs an event detecting means.

The application executing unit 7 carries out the same process as that carried out by the application executing unit 4 shown in FIG. 1, and also carries out a process of issuing a request for registration of an event associated with an application currently being executed to the event detection managing unit 6, and, when the event detection managing unit 6 detects occurrence of the event registered thereby, issuing a request for assignment of a remote control button to the event to a button assignment management unit 8, and so on.

The button assignment management unit 8 carries out the same process as that carried out by the button assignment management unit 5 shown in FIG. 1, and also carries out an assignment process of respectively assigning a plurality of application IDs to remote control buttons, management of the display state of a user interface, and so on.

Figure 13:
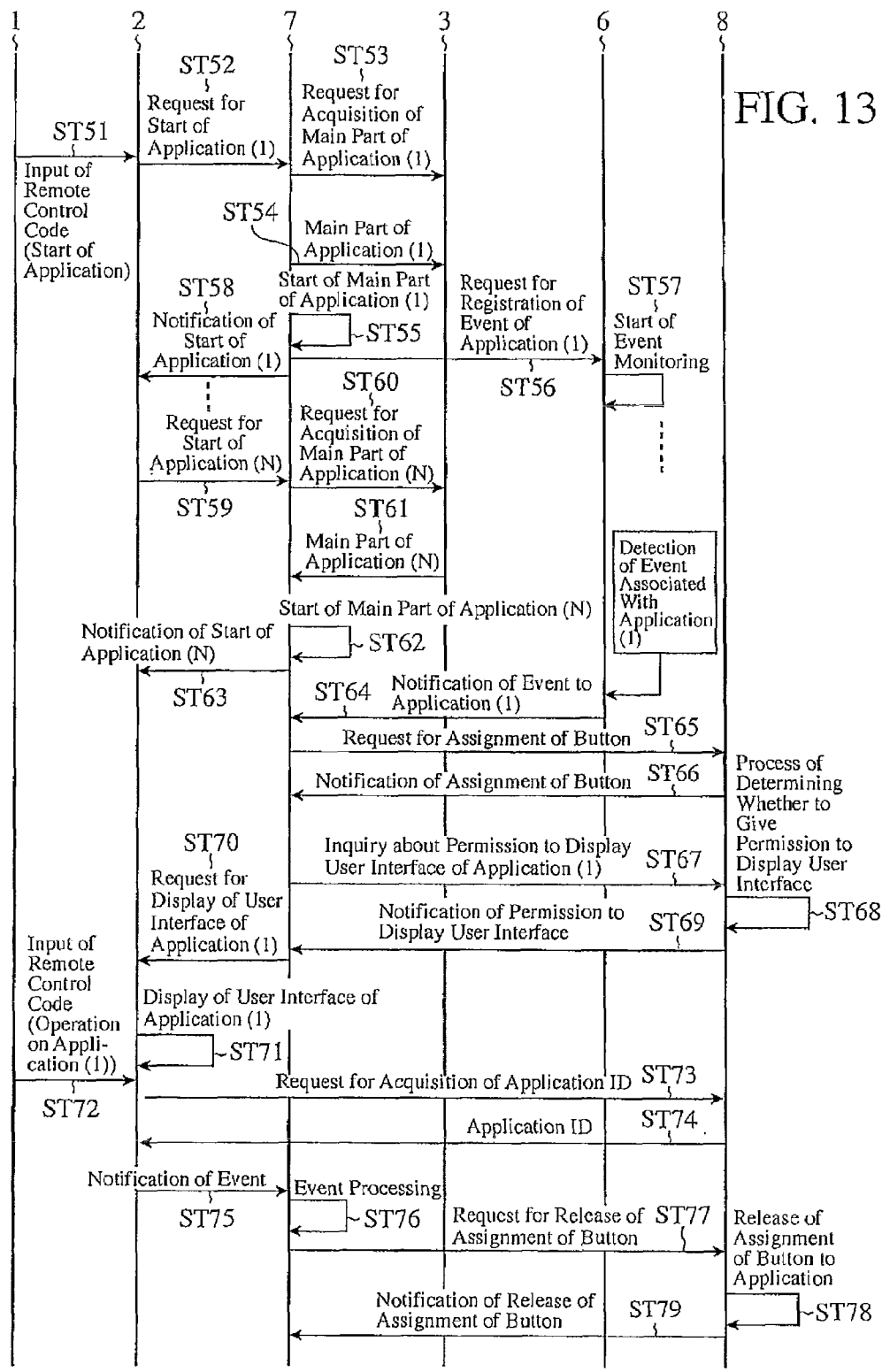
FIG. 13 is a sequence diagram showing processing which is carried out by the application executing terminal in accordance with Embodiment 7 of the present invention.

FIG. 13 is a sequence diagram showing processing which is carried out by the application executing terminal in accordance with Embodiment 7 of the present invention.

Next, the operation of the application executing terminal will be explained.

In this Embodiment 7, it is assumed that an application to be started is registered in advance and, after the application is started, whenever the event detection managing unit 6 detects occurrence of an event, the application processes the event.

When the user pushes down a remote control button for instructing the application executing terminal to start an application, the remote control transmits a remote control code corresponding to the remote control button which instructs the application executing terminal to start the application.

When receiving the remote control code transmitted from the remote control, a remote control code receiving unit 1 converts the remote control code into a code in the form which a user interface unit 2 can interpret, and notifies the code to the user interface unit 2 (step ST51).

When receiving the remote control code from the remote control code receiving unit 1, the user interface unit 2 recognizes the instruction for starting the application from the remote control code and then issues a request for start of the application to the application executing unit 7.

At this time, in this Embodiment 7, it is assumed that the user interface unit 2 has acquired an application list from the application executing unit 7, and starts applications (1) to (N) which are registered in advance all at once with reference to the application list.

The user interface unit 2 issues a request for start of the application (1) to the application executing unit 7 first (step ST52).

When receiving the request for start of the application (1) from the user interface unit 2, the application executing unit 7 acquires the main part file path 42 of the application (1) from the application list shown in FIG. 4.

The application executing unit 7 then outputs a request for acquisition of the main part of the application (1), as well as the main part file path 42, to an application storage unit 3 (step ST53), and acquires the main part of the application (1) from the application storage unit 3 (step ST54).

When acquiring the main part of the application (1) from the application storage unit 3, the application executing unit 7 starts the main part of the application (1) (step ST55) so as to start executing the application (1).

The application (1) being executed by the application executing unit 7 issues a request for registration of a specific event to the event detection managing unit 6 as a process at the start-up (step ST56).

When receiving the request for registration of the specific event from the application (1), the event detection managing unit 6 accepts the registration and starts an event monitoring process of monitoring the specific event (step ST57).

Figures 14, 15, 16:
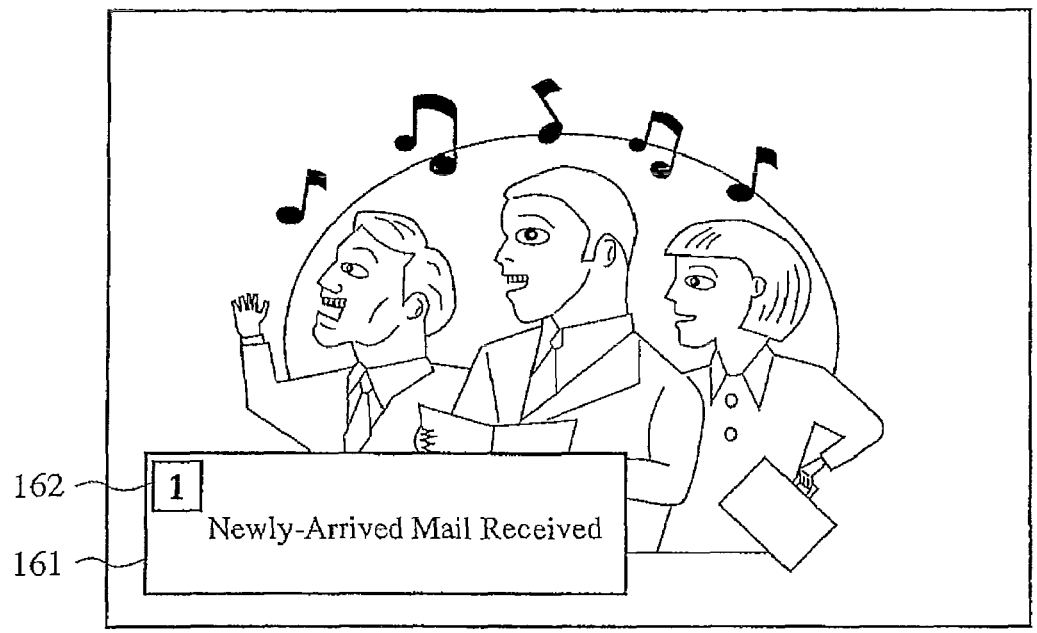
FIG. 14 is an explanatory drawing of an event management table showing events registered by an event detection managing unit 6.
FIG. 15 is an explanatory drawing showing a button assignment management table.
FIG. 16 is an explanatory drawing showing a user interface screen at a time when an event showing reception of a newly-arrived mail is detected.

FIG. 14 is an explanatory drawing of an event management table showing events which are registered by the event detection managing unit 6.

FIG. 14 shows an example in which the application ID associated with the events registered is "mail client", and the registered events are "reception of newly-arrived mail" and "completion of transmission".

In this case, when detecting either "reception of newly-arrived mail" or "completion of transmission", the event detection managing unit 6 notifies occurrence of the event to the application (1) whose application ID is the "mail client" among the applications currently being executed by the application executing unit 7.

When starting executing the application (1) and then completing the starting process, the application executing unit 7 notifies the user interface unit 2 that the application executing unit has completed the start-up of the application (1) (step ST58).

Although a description will be made hereafter assuming that the application (1) does not display any user interface at the time when its start-up is completed, whether each application displays a user interface immediately after started is determined dependently upon each application.

After that, the application executing unit also carries out the same starting process as that performed on the application (1) on each of the applications (2) to (N) (steps ST59 to ST63).

The event detection managing unit 6 monitors the events registered with reference to the event management table shown in FIG. 14. For example, when an event associated with the application (1) whose application ID is the "mail client" occurs, the event detection managing unit detects the occurrence of the event and notifies the occurrence of the event to the application (1) (step ST64).

When receiving the notification of the occurrence of the event from the event detection managing unit 6, the application (1) currently being executed by the application executing unit 7 carries out a process corresponding to the notification of the occurrence of the event.

More specifically, the application (1) outputs both its application ID and user interface state information indicating whether or not the application (1) is displaying a user interface to the button assignment management unit 8, and then issues a request for assignment of a remote control button to the button assignment management unit 8 (step ST65).

When receiving the request for assignment of a remote control button, the button assignment management unit 8 carries out an assignment process of assigning a remote control button with reference to the button assignment management table as shown in FIG. 15.

In FIG. 15, each user interface state shows whether or not a corresponding application is displaying a user interface.

In FIG. 15, an example in which an application whose application ID is "mail client" is in a state of "not displayed", and an application whose application ID is "weather forecast" is in a state of "not displayed", and an application whose application ID is "program list" is in a state of "currently displayed" is shown.

As also shown in the example of the remote control button of "2", the application executing terminal manages the user interface state of each application to allow assignment of a plurality of applications to a single remote control button.

After carrying out the assignment process of assigning a remote control button, the button assignment management unit 8 notifies the result of the assignment of a remote control button to the application (1) currently being executed by the application executing unit 7 (step ST66).

Next, the application (1) inquires of the button assignment management unit 8 whether the application can display a user interface (step ST67).

When receiving the inquiry about whether the application (1) can display a user interface from the application (1), the button assignment management unit 8 carries out a user interface display permission determining process (step ST68).

More specifically, the button assignment management unit 8 refers to the button assignment management table shown in FIG. 15, and, when there is no application in the user interface state of "currently displayed" among the applications which are registered with being associated with the remote control button associated with the application (1), determines to permit a display of a user interface.

In contrast, when there is an application in the user interface state of "currently displayed" among the registered applications, the button assignment management unit determines not to permit any display of a user interface.

For example, because there is no application in the user interface state of "currently displayed" among the applications which are registered with being associated with the remote control button (1) when the application ID of the application (1) is "mail client", the button assignment management unit determines to permit a display of a user interface.

For example, because there is an application in the user interface state of "currently displayed" among the applications which are registered with being associated with the remote control button (2) when the application ID of the application (1) is "weather forecast", the button assignment management unit determines not to permit any display of a user interface.

In other words, the button assignment management unit 8 provides display permission in such a way that only one application which displays a user interface is associated with each remote control button.

The button assignment management unit 8 then notifies the result of the user interface display permission determining process to the application (1) (step ST69).

When receiving the notification of the determination indicating that the application (1) currently being executed by the application executing unit 7 is permitted to display a user interface from the event detection managing unit 6, the application (1) issues a request for display of a user interface to the user interface unit 2 (step ST70).

When receiving the request for display of the user interface from the application (1), the user interface unit 2 displays the user interface of the application (1) on the user interface screen (step ST71), and starts receiving the user's input to the application (1).

FIG. 16 is an explanatory drawing showing the user interface screen at the time when an event indicating reception of a newly-arrived mail is detected. in the figure, reference numeral 161 denotes a mail client application displayed on the user interface screen, and reference numeral 162 denotes button display characters generated from button information notified from the button assignment management unit 8.

When the user operates the remote control button associated with the application (1), the remote control code receiving unit 1 receives a remote control code indicating the remote control button, converts the remote control code into a code in the form which the user interface unit 2 can interpret, and notifies the code to the user interface unit 2 (step ST72).

When receiving the remote control code from the remote control code receiving unit 1, in order to verify that the remote control button indicated by the remote control code is associated with a specific application, the user interface unit 2 issues a request for acquisition of the application ID corresponding to the remote control button indicated by the remote control code to the button assignment management unit 8 (step ST73).

When receiving the request for acquisition of the application ID corresponding to the remote control button from the user interface unit 2, the button assignment management unit 8 verifies the application ID corresponding to the remote control button with reference to the button assignment management table shown in FIG. 15, and notifies the application ID to the user interface unit 2 (step ST74).

In this case, because the user has operated the remote control button associated with the application (1), the button assignment management unit notifies the application ID of the application (1) to the user interface unit 2.

When receiving the notification of the application ID corresponding to the application (1) from the button assignment management unit 8, the user interface unit 2 provides a predetermined event for the application (1) currently being executed by the application executing unit 7 (step ST75).

When receiving the notification of the predetermined event from the user interface unit 2, the application (1) currently being executed by the application executing unit 7 performs a process corresponding to the event (step ST76).

Furthermore, after performing the process corresponding to the event, the application (1) currently being executed by the application executing unit 7 judges whether there is a necessity to keep the assignment of the remote control button to the event, and, when judging that there is no necessity to keep the assignment of the remote control button to the event, makes a request for deassignment of the remote control button.

When the application (1) makes a request for deassignment of the remote control button, the application executing unit 7 outputs the application ID of the application (1) to the button assignment management unit 8, and issues a request for deassignment of the remote control button to the button assignment management unit 8 (step ST77).

When receiving both the application ID and the request for deassignment of the remote control button from the application executing unit 7, the button assignment management unit 8 releases the assignment of the remote control button to the application ID by setting the application ID in the button assignment management table shown in FIG. 15 to "yet-to-be assigned" (step ST78), and notifies the application executing unit 7 that the button assignment management unit has released the assignment of the remote control button (step ST79).

As can be seen from the above description, the application executing terminal in accordance with this Embodiment 7 is constructed in such a way that the event detection managing unit 6 accepts registration of an event associated with an application currently being executed by the application executing unit 7 and carries out the detecting process of detect in a occurrence of the event, and, when the event detection managing unit 6 detects occurrence of the event, the application executing unit 7 makes a request of the button assignment management unit 8 for assignment of a remote control button to the event. Therefore, this Embodiment 7 provides an advantage of being able to start an application only when an event associated with the application occurs without always causing the user to start the application.

Furthermore, the application executing terminal in accordance with this Embodiment 7 is constructed in such a way that when the event detection managing unit 6 detects occurrence of an event, the user interface unit 2 displays the user interface of a corresponding application currently being executed by the application executing unit 7. Therefore, this Embodiment 7 provides an advantage of being able to enable the user to perform an operation easily by using the remote control button associated with the application.

In this Embodiment 7, when the event detection managing unit 6 detects occurrence of an event, a corresponding application currently being executed by the application executing unit 7 issues a request for display of a user interface to the user interface unit 2, as shown above. In this case, the user interface unit does not have to display the user interface immediately after occurrence of the event has been detected, and, when the user operates the remote button and the remote control code receiving unit then receives a remote control code corresponding to the remote control button, the user interface unit can display applications which are permitted to display their user interfaces by the button assignment management unit 8 all at once in response to the reception of the remote control code.

INDUSTRIAL APPLICABILITY

As mentioned above, the application executing terminal in accordance with the present invention is suitable for use in accepting start of one of various applications through operation of a remote control button.

The invention claimed is:
1. An application executing terminal comprising:
a user interface unit that accepts a selection of an application to be started to make a start request for start of said application;
an application executing unit that executes an application for which a start request has been made by said user interface unit;
a button assignment management unit that receives a request for assignment of an operation button to an application currently being executed and controls the carrying out of a process of assigning an operation button to an application for which a request for assignment of the operation button has been made and manages an assignment relation between the operation button and the application;

a remote control code receiving unit that receives operation information indicating an operation button operated by a user; wherein said user interface unit inquires of said button assignment management unit about an application corresponding to the operation button indicated by the operation information received by the remote control code receiving unit to notify a predetermined event associated with said application to said application executing unit.

2. The application executing terminal according to claim 1, wherein when receiving a request for deassignment of an operation button from an application currently being executed by the application executing unit, the button assignment management unit releases the assignment of the operation button to said application.

3. The application executing terminal according to claim 1, wherein when the button assignment management unit manages a predetermined event associated with an application as well as an assignment relation between an operation button and the application, the user interface unit inquires of said button assignment management unit about the application corresponding to the operation button indicated by the operation information received by the remote control code receiving unit, and also inquires of said button assignment management unit about an event associated with said application to notify the event associated with said application to said application executing unit.

4. The application executing terminal according to claim 1, wherein when making a request for assignment of an operation button to an application, the button assignment management unit specifies a rule for assignment of an operation button, and carries out the assignment process of assigning the operation button to the application according to the rule for assignment of an operation button.

5. The application executing terminal according to claim 1, wherein the assignment relation between the operation button and the application which is managed by the button assignment management unit is displayed by said user interface unit.

6. The application executing terminal according to claim 1, wherein, when there exists a remote control button to which a predetermined function has been assigned, the user interface unit notifies the button assignment management unit that the predetermined function has been assigned to said remote control button.

7. The application executing terminal according to claim 1, wherein the user interface unit inquires of the button assignment management unit about an application corresponding to the operation button indicated by the operation information received by the remote control code receiving unit to make a request for start of said application.

8. The application executing terminal according to claim 1, wherein the application executing unit manages pieces of meta information about applications, and, when making a request for assignment of an operation button to an application, notifies an operation button desired to be assigned to the application to the button assignment management unit with reference to said meta information.

9. The application executing terminal according to claim 1, wherein said user interface unit accepts arrangement of applications on a user interface screen and when the request for assignment of an operation button to an application is made, notifies the button assignment management unit of the accepted arrangement of applications.

10. The application executing terminal according to claim 1, further comprising an event detecting management unit that accepts registration of an event associated with an application being executed by the application executing unit, and detects occurrence of said event wherein, when said event detecting management unit detects occurrence of the event, the button assignment management unit makes a request for assignment of an operation button to said event.

11. The application executing terminal according to claim 10, wherein, when said event detecting management unit detects occurrence of the event, the user interface unit displays a user interface of the application being executed by the application executing unit.

12. The application executing terminal according to claim 10, wherein, when the remote control code receiving unit receives the operation information, the user interface unit displays a user interface of the application being executed by the application executing unit.

* * * * *